United States Patent Office 3,835,101
Patented Sept. 10, 1974

3,835,101
MELT BLENDS OF CARBOXYLIC ACID TERMINATED, LOW MOLECULAR WEIGHT POLYAMIDE AND POLYVALENT METAL COMPOUNDS
Hendrikus J. Oswald, Morristown, and Krishnan Thiruvillakkat, East Orange, N.J., assignors to Allied Chemical Corporation, New York, N.Y.
No Drawing. Filed Apr. 13, 1972, Ser. No. 243,861
Int. Cl. C08g 20/38
U.S. Cl. 260—78 SC       11 Claims

ABSTRACT OF THE DISCLOSURE

Process for obtaining a melt shapable polyamide having substantially increased solution and melt viscosities by melt reacting an essentially non-melt-shapable, low molecular weight polyamide with suitable polyvalent metal compounds capable of reacting with at least about 80 percent of the acid groups of the polymer.

BACKGROUND OF THE INVENTION

Many of the useful properties of polyamides, including the high strength, high melting temperature and high rigidity are fully developed only at higher molecular weight. For example, polyamides of number average molecular weight <5,000 are brittle solids having no characteristics polymeric properties. For polyamides to be used as plastics, fibers, and films the number average molecular weight should be >10,000. The lowest molecular weight which can be tolerated for any specific application depends on the strength of intermolecular forces, the cumulative effect of which diminishes with decreasing number of repeating units in the polymer chain. Thus, polyamdes having a molecular weight <5,000 are hardly suitable for melt shaping into useful articles such as plastics and fibers.

Ionic linking of thermoplastic polymers containing reactive functional groups has been disclosed heretofore, see U.S. Pat. 3,322,734. In that patent ionic cross-linking of methyl methacrylate polymers having acid free acid groups is effected in one-phase solvent solutions of polymer and metal compounds to obtain some strength improvements. In U.S. Pat. 3,493,550, Schmitt et al., Feb. 3, 1970, an interfacial process is disclosed for obtaining thermoplastic polyvalent metal-bridged polymers based on major amounts of methyl methacrylate and having a minor amount of carboxylic acid groups.

SUMMARY OF THE INVENTION

In accordance with the present invention, a process is provided for converting an essentially non-melt shapable polyamide into a readily melt shapable polyamide by a melt reaction of the polyamide with a polyvalent metal compound, which reacts with the acid groups of the polymer, and without requiring that the polymer undergo further polymerization. The invention further affords a process for obtaining ionically linked linear polyamide by reacting a polyamide containing an amount of free acid groups with a suitable metal compound.

Another object of the present invention is to provide a process for obtaining an ionically cross-linked, three dimensional network structure from a branched polyamide having more than two carboxylic end groups per molecule.

Still another object of the present invention is to provide a process whereby the mechanical properties of the thus ionically cross-linked polyamide are further improved by the addition of suitable fillers and reinforcing agents.

Other and related objects and advantages will be apparent from the following description of the invention.

DESCRIPTION OF THE PREFERRED EMBODIMENT

Many of the useful properties of polyamides, including the high strength, high melting temperature and high rigidity are fully developed only at higher molecular weight. For example, polyamides of number average molecular weight <5,000 are brittle solids having no characteristic polymeric properties. For polyamides to be used as plastics, fibers and films, the number average molecular weight should be >10,000. The lowest molecular weight which can be tolerated for any specific application depends on the strength of intermolecular forces, the cumulative effect of which diminishes with decreasing number of repeating units in the polymer chain. Thus, polyamides having a number average molecular weight <5,000 are hardly suitable for melt shaping into useful articles such as plastics and fibers.

We have found that low molecular weight polyamides having an amount of free reactive acidic functional groups when reacted in melt for a suitable length of time with suitable polyvalent metal compound(s) are found to yield polymeric products having substantially increased solution and melt viscosities. The thus obtained polymeric products can be melt shaped in conventional manner to give articles of superior tensile properties, whereas the unmodified, low molecular weight telomer type of parent polymer cannot be melt shaped.

The process of the present invention is effective with polyamides containing some free reactive carboxylic acid groups. The term polyamide is intended to include all the linear chain polymers containing characteristic amide (—NHCO) groups. These include polyamides obtained by the polymerization of amino acids and those polyamides obtained by condensation of diamines with diacids. The former class of polyamide can be represented by the general formula

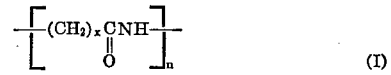

(I)

where $x$ is an integer and has a value ranging from 3 to 11 and $n$ is an integer of from about 2 to 50. Important commercial polyamides of this class include nylon 4, nylon 6, nylon 11, nylon 12 and the like. Polyamides obtained by the condensation of diamines with diacids can be represented by a general formula

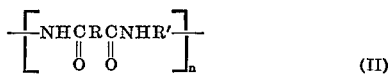

(II)

where R and R' correspond to diamine and diacid respectively. Important commercial polyamides of this class include nylon 6,6, nylon 6,10 and the like. In addition to the above mentioned polyamides, other polyamides suitable for the process of this invention may include substituted polyamides and copolyamides containing less than 10% copolymerized units.

The necessary acid groups may be attached to the polyamides in a variety of ways. For example, in the case of polyamides prepared from amino acids and represented by formula (I), this can be accomplished by incorporating suitable di- or polyfunctional acid initiators into the polymerization system. Depending on the functionality of the acid initiator, one can obtain either essentially linear or branched polyamide containing acid end groups. In case of polyamides prepared from diamines and diacids and represented by formula (II), the desired amount of acid end groups can be obtained by carrying out the polymerization reaction in the presence of an excess of diacid component. It should be further noted that polyamides represented by formula (II) can be obtained in the form of branched polyamide containing acid end groups provided that the concentration and functionality of the polyfunctional acid initiator are judiciously controlled in order to prevent the reactions leading to an infinite network. These conditions under which one can obtain a branched polymer have been described in detail in literature (see, for example, "Principles of Polymer Chemistry," by P. J. Flory, page 348; Cornell University Press, 1953).

The polyfunctional acid initiator employed to obtain polyamides having reactive acidic functional groups are those which contain two or more carboxylic acid groups per molecule. Polyfunctional acid initiators suitable for the process of the present invention include dicarboxylic acids, such as oxalic acid, succinic acid, adipic acid, sebacic acid, pthalic acid (and its isomers), and polycarboxylic acids, such as trimesic acid, pyromellitic acid, ethylene diamine tetraacetic acid and the like.

In general, the molecular weight of the polyamide and the amount of carboxylic group content therein are dependent on the functionality and concentration of the polyfunctional acid initiator employed. The preferred amount of carboxylic acid initiator in the polyamide for the process of the present invention may, in general, vary from 0.5 to 30% by weight; although it is quite possible to have the value beyond this range and be still useful for the purpose of the present invention.

The metal compounds useful in the process of the present invention are those wherein the metal therein is at least bivalent and may even be of higher valency, i.e., polyvalent. The metallic cation can be added to the polyamide in the form of oxide, hydroxide, salt or organometallic compounds. Suitable metal cations include $Ca^{+2}$, $Ba^{+2}$, $Sr^{+2}$, $Cd^{+2}$, $Mg^{+2}$, $Zn^{+2}$, $Al^{+3}$, $Ni^{+2}$, $Co^{+2}$, $Be^{+2}$ and the like. Typical metal compounds include CaO, BaO, SrO, CdO, MgO, ZnO, $Al_2O_3$, $Ca(OH)_2$, $Ba(OH)_2$, $Mg(OH)_2$, $Sr(OH)_2$, Ca acetate, Mg acetate, Be acetate, Zn acetate, Ca formate, Mg formate, Zn formate and the like. It is not essential that only one metal ion be employed in the cross-linking reaction, and more than one metal ion may be preferred in some instances.

The quantity of metal compounds employed depends on the concentration of carboxylic acid group in the prepolymer. In general, it was found that the concentration of the ionic linking agent should be sufficient to react with at least 90% of the acid groups in order to obtain a significant improvement in the solid state properties of the polymer.

According to the process of the present invention, the melt blending of the low molecular weight, acid terminated polyamide and the suitable metal compounds can be readily carried out in conventional apparatus consisting of a reaction vessel equipped with a stirrer, an inlet for inert gas and a thermometer. Alternately, a melt mixer such as a Brabender Plastograph can be more advantageously employed to give a continuous melt viscosity versus time curve. The melt reaction should be carried out under inert gas medium in order to prevent the oxidative degradation of the polymer. The length of time required to effect the reaction is short and of the order of ½ hour to 1 hour. In general, leveling off the melt viscosity determines when the reaction is essentially complete.

When it is desired to incorporate a filler compound this can be easily accomplished by adding the filler compound before or after the melt reaction. However, it is preferred to incorporate the filler before the melt reaction with the metal compound because of the lower melt viscosity and excellent wetting characteristics of the parent polymer prior to melt reaction.

Filler materials in amounts of from 1% to about 80% by weight, and preferably from about 10% to 50% by weight, may be usefully employed herein in conjunction with the amide polymers; such fillers are selected from a wide variety of minerals, metals, metal oxides, siliceous materials including short (i.e., less than about ½ inch) glass fibers, metal salts, and mixtures thereof. These fillers may optionally be treated with various coupling agents or adhesion promotors, as is known to those skilled in the art. Advantageous physical properties are achieved if the filler material has a Young's modulus of $10^7$ p.s.i. or greater, and at least a Young's modulus twice as great as that of the polyamide. Examples of fillers included in these categories are alumina, aluminum hydrates, feldspar, asbestos, calcium carbonates, carbon black, quartz and other forms of silica, Kaolinite, bentonite, garnet, saponite, beidellite, calcium oxide, calcium hydroxide, etc.

The fillers listed above are given as examples only and are not meant to limit the scope of fillers which can be utilized in this invention. It should also be evident that the same mechanism which allows for highly effective resin-fiber interfacial interaction, i.e. that resulting from the low melt viscosities and low surface tensions of low molecular weight polymers, will also result in improved polymer-filler interaction and hence increased adhesion between these two dissimilar phases. Adhesion promoting agents or coupling agents may, of course, also be utilized on both the fibrous or particulate filler phase.

The invention is more fully illustrated in the following examples wherein the percentages are by weight unless otherwise specifically stated. The examples are intended to be illustrative only and not as limitations on the scope of the invention except as set forth in the appended claims.

EXAMPLE 1

A low molecular weight acid terminated nylon 6 was synthesized by polymerization of E-caprolactam in the presence of sebacic acid as chain terminator and amino caproic acid as catalyst. At the end of polymerization, the polymer was extracted in boiling water to remove unreacted caprolactam and oligomers and was characterized by end group analysis, reduced viscosity and melt index as follows:

Carboxyl (—COOH) end groups=1.017 meq./gm.
Amine (—$NH_2$) end groups=0.012 meq./gm.
$\eta sp/c$* dl./g. in m-cresol=0.26
Number average molecular weight, $M_n$=2,000
Melt index, gms./10 min. (235° C., 2160 g. load)=5,000 gms.

The polymer could not be molded to give films for tensile testing due to its extremely low melt viscosity. Using a Brookfield viscometer, the melt viscosity at 235° C. was found to be 100–120 poise.

EXAMPLE 2

100 gms. of the polymer synthesized in Example 1 was charged into a resin flask equipped with a nitrogen inlet stirrer and thermometer. The flask was heated under nitrogen stream until the polymer was melted. The melt was stirred thoroughly for 30 minutes to attain homogeneity. To the melt, 5 gms. of $Ca(OH)_2$ was added and stirring was continued. The viscosity was found to rise in about 10 minutes as observed in slowing down the stirrer shaft, and stirring was continued for another 45 minutes. The melt was cooled gradually under nitrogen stream. The polymer was characterized for solution and melt viscosities; molded films were tested for tensile properties. The results are shown in Table I.

EXAMPLES 3–4

In these examples we illustrate the effect of varying concentrations of $Ca(OH)_2$ in nylon 6 melt. Polymer synthesized in Example 1 was melt reacted with 20% and 40% by weight of $Ca(OH)_2$ respectively. The products were characterized as in Example 2. The properties ---
*Reduced viscosity $\eta sp/c$, was measured on 0.5% solution of the polymer in m-cresol @ 23° C. All reported viscosities are measured in the same manner.

are shown in Table I indicating a decrease in all the properties in sample No. 4 wherein the concentration of $Ca(OH)_2$ was 40%.

Example: Composition
3 ____ Control polymer+20% $Ca(OH)_2$
4 ____ Control polymer+40% $Ca(OH)_2$

TABLE I

| Example | Melt viscosity, poise | Shear rate, sec.$^{-1}$ | $\eta$ sp/c, dl./g. | Tensile properties | | Tensile modulus, p.s.i. |
|---|---|---|---|---|---|---|
| | | | | UTS, p.s.i. | UE, percent | |
| 1 | 120 | 15.0 | 0.26 | | | |
| 2 | 1,120 | 26.2 | 0.38 | 920 | 0.59 | 1.98×10$^5$ |
| 3 | 3,000 | 65.0 | 0.78 | 4,257 | 3.05 | 2.32×10$^{-5}$ |
| 4 | 450 | 64.5 | 0.16 | 680 | 0.41 | 1.78×10$^{-5}$ |

EXAMPLES 5–8

These examples are intended to illustrate the effect of mixture of metal oxide or metal salt and $Ca(OH)_2$ in the reaction melt. Melt reaction was carried out as described in Example 2 for using the polymer composition of that example and the stated metal compounds.

Example: Composition
5 ____ Control polymer+20% $Ca(OH)_2$+10% CaO
6 ____ Control polymer+20% $Ca(OH)_2$+10% $Al_2O_3$
7 ____ Control polymer+26.5% $Ca(OH)_2$+6.5% ZnO
8 ____ Control polymer+20% $Ca(OH)_2$+10% tin sebacate The properties of these samples are shown in Table II.

TABLE II

| Example | Melt viscosity, poise | Shear rate, sec.$^{-1}$ | $\eta$ sp/c, dl./g. | Tensile properties | | Tensile modulus, p.s.i. |
|---|---|---|---|---|---|---|
| | | | | UTS, p.s.i. | UE, percent | |
| 5 | 4,040 | 48.5 | 0.70 | 4,111 | 2.35 | 2.65×10$^5$ |
| 6 | 4,760 | 41.0 | 0.99 | 6,345 | 2.38 | 3.28×10$^5$ |
| 7 | 4,550 | 43.0 | 0.79 | 4,545 | 1.5 | 3.54×10$^5$ |
| 8 | 6,250 | 31.3 | 0.68 | 4,530 | 1.2 | 4.5×10$^5$ |

EXAMPLES 9–11

In these examples, we illustrate the improvement in properties obtained by melt blending nylon 6 having a number average molecular weight of about 5,000 with metal compounds. The melt reaction was carried out in a Brabender Plasticorder at a temperature of 250° C. The reaction time was ½ hour within which the melt viscosity levelled off.

Example: Composition
9 ____ Control N=6 Mw=5,000
10 ___ Control polymer+10% CaO+20% $Ca(OH)_2$
11 ___ Control polymer+20% $Ca(OH)_2$ The tensile properties of molded films are shown in Table III. It should be noted that the control polymer could not be molded due to its extremely low melt viscosity.

TABLE III

| Example | Tensile properties | | |
|---|---|---|---|
| | UTS, p.s.i. | UE, percent | Tensile modulus, p.s.i. |
| 9 | | | |
| 10 | 5,535 | 3.2 | 2.51×10$^5$ |
| 11 | 5,400 | 3.8 | 2.86×10$^5$ |

EXAMPLES 12–13

In these examples, low molecular weight acid terminated nylon-6 having molecular weights (Mw) of 2,000 (Example 1) and 5,000 (Example 9) were blended with 60% by weight of asbestos filler. The melt blending was performed in a Brabender Plasticorder at a temperature of 260° C. These melt blended products were subsequently molded to obtain test specimens. The tensile properties and compression strength tested at 23° C. and 50% R.H. are shown in Table IV.

TABLE IV

| Ex. | Composition | UTS, p.s.i. | UE, percent | TM, p.s.i. ×10$^{-5}$ | Compressive strength, p.s.i. |
|---|---|---|---|---|---|
| 12 | N-6 (M.W.=2,000) plus 60% asbestos | 2,600 | 0.5 | 6.02 | 14,260 |
| 13 | N-6 (M.W.=5,000) plus 60% asbestos | 3,000 | 0.52 | 6.18 | 14,290 |

EXAMPLES 14–15

In these examples, we illustrate the improvement in tensile strength achieved by incorporating asbestos filler in chain extended nylons. Extended nylon 6 polymers of Examples 3 and 10 were melt blended with 60% by weight of asbestos in a Brabender Plasticorder. The melt temperature was maintained at 260° C. Subsequently, these filled polymer samples were molded to obtain test specimens. Testing was performed as described in Examples 12 and 13 and the results are shown in Table V.

TABLE V

| Ex. | Composition | UTS, p.s.i. | UE, percent | TM, p.s.i. ×10$^{-5}$ | Compressive strength, p.s.i. |
|---|---|---|---|---|---|
| 14 | Ex. (3) plus 60% asbestos | 3,160 | 0.83 | 4.8 | 12,220 |
| 15 | Ex. (10) plus 60% asbestos | 3,650 | 1.4 | 5.1 | 12,000 |

EXAMPLES 16–20

In these examples we illustrate the effect of adding a polyvalent metal compound to a branched, low molecular weight, acid terminated nylon-6. The latter polymer was obtained by melt mixing a fiber forming high molecular weight nylon-6 (Mn=22,000, sp/c=1.8 dl./g. in meta cresol) with 5% by weight of pyromellitic acid (1,2,4,5-benzene tetracarboxylic acid). The resulting polymer had a reduced viscosity in m-cresol of 0.46 dl./g. This corresponds to an average degree of polymerization (DP) of approximately 50 or approximately 12 DP per branch. This branched polyamide was subsequently reacted with various amounts of polyvalent metal compounds. The reaction was carried out in a Brabender Plasticorder at a temperature of 260° C. The reaction time was of the order of 30 minutes within which the melt viscosity levelled off. The resulting polymers were characterized for solution viscosity. Compression molded films from these products were tested for tensile properties at 23° C. and 50% R.H. The results of viscosity determination and tensile properties are shown in Table VI.

TABLE VI

| Ex. | Composition | $\eta_{sp/c}$ | UTS, p.s.i. | UE, percent | TM, p.s.i. ×10⁻⁵ |
|---|---|---|---|---|---|
| 16 | Control polymer | 0.46 | 4,780 | 7.62 | 1.25 |
| 17 | (16) plus 5% Ca(OH)₂ | 0.90 | 5,886 | 5.37 | 1.92 |
| 18 | (16) plus 7.5% Ca(OH)₂ | 0.89 | 6,451 | 4.34 | 2.26 |
| 19 | (16) plus 10% Ca(OH)₂ | 0.74 | 6,792 | 5.16 | 2.26 |
| 20 | (16) plus 10% CaO | 0.75 | 7,056 | 4.77 | 2.45 |

EXAMPLES 21-22

Here we illustrate the effect of incorporating fillers on the mechanical properties of chain extended nylon-6. Polymer prepared in Example 19 was melt blended with a microcrystalline silica having an average particle size of 3.8 microns. Another portion of polymer prepared in Example 19 was melt blended with short asbestos fiber. Melt blending was performed in a Brabender at 260° C. for about 30 minutes. The resulting filled polymers were tested for tensile, compressive and flexural properties at 23° C. and 50% R.H. The results are shown in Table VII.

TABLE VII

| Example | Composition | UTS, p.s.i. | UE, percent | TM, p.s.i. ×10⁻⁵ | Flex. strength, p.s.i. | Flex. modulus, p.s.i. ×10⁻⁶ | Compr. strength, p.s.i. |
|---|---|---|---|---|---|---|---|
| 21 | Ex. (19) plus 50% silica* | 9,000 | 1.9 | 5.22 | 13,527 | 0.75 | 16,597 |
| 22 | Ex. (19) plus 50% asbestos | 6,030 | 1.0 | 6.49 | 9,673 | 1.28 | 14,375 |

*From Malvern Minerals Co., Hot Springs, Arkansas.

We claim:

1. A process for obtaining a melt shapable polyamide having substantially increased solution and melt viscosities and improved tensile properties which comprise melt blending (A) a carboxylic acid terminated low molecular weight linear chain polyamide having the general formula

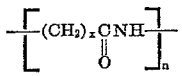

wherein $n$ is an integer chosen such that the number average molecular weight is less than 5,000, $x$ is an integer having a value of 3 to 11, with (B) a metal compound consisting essentially of a metal oxide, a metal hydroxide, or corresponding salts of metals which are at least bivalent and are selected from the group consisting of calcium, barium, strontium, cadmium, magnesium, zinc, aluminum, nickel, cobalt and beryllium and wherein (B) is present in amounts sufficient to react with at least 90% of the acid groups of (A).

2. The process of claim 1 wherein the linear chain polyamide is obtained by polymerization of amino acids and wherein the polyamide is represented by the general formula

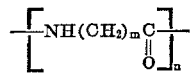

where $m$ is an integer ranging from 3 to 11 and $n$ is an integer of from about 2 to 50.

3. The process of claim 1 wherein the polyamide is poly(E-caprolactam).

4. The process of claim 1 wherein the polyamide is a copolyamide containing less than 10% copolymerized units of a different amide.

5. The process of claim 1 wherein the metal compound is a metal hydroxide.

6. The process of claim 5 wherein the metal hydroxide is calcium hydroxide.

7. The process of claim 1 wherein the metal compound is a mixture of metal oxide and metal hydroxide.

8. The process of claim 7 wherein the mixture consists of calcium oxide and calcium hydroxide.

9. The process of claim 7 wherein the mixture consists of zinc oxide and calcium hydroxide.

10. The process of claim 7 wherein the mixture consists of alumina and calcium hydroxide.

11. The product consisting essentially of a melt shapable polyamide produced by the method of claim 1.

References Cited
UNITED STATES PATENTS

| | | | |
|---|---|---|---|
| 2,510,777 | 6/1950 | Gray | 260—78 SC |
| 2,557,808 | 6/1951 | Walker | 260—78 SC |
| 3,078,248 | 2/1963 | Ben | 260—78 L |
| 3,509,107 | 4/1970 | Brignac | 260—78 SC |

HAROLD D. ANDERSON, Primary Examiner

U.S. Cl. X.R.

260—37 N, 78 A, 78 L, 78 TF

// PO-1050 (5/69)

UNITED STATES PATENT OFFICE
CERTIFICATE OF CORRECTION

Patent No. 3,835,101     Dated September 10, 1974

Inventor(s) Hendrikus J. Oswald and Krishnan Thiruvillakkat

It is certified that error appears in the above-identified patent and that said Letters Patent are hereby corrected as shown below:

Column 1, line 28, "acteristics" should be -- acteristic --.

Column 1, line 35, "polyamdes" should be -- polyamide --.

Column 5, line 68, "Control N=6" should read -- Control N-6 --.

Column 5, line 71, after "Control polymer+" insert -- 10% CaO+ --.

Column 7, Claim 1, line 33, "comprise" should be -- comprises --.

Signed and sealed this 7th day of January 1975.

(SEAL)
Attest:

McCOY M. GIBSON JR.
Attesting Officer

C. MARSHALL DANN
Commissioner of Patents